United States Patent [19]
Banker et al.

[11] Patent Number: 5,358,289
[45] Date of Patent: Oct. 25, 1994

[54] BUTTRESS-THREADED TUBULAR CONNECTION

[75] Inventors: Edward O. Banker, Houston, Tex.; Teruo Suzuki, Yokohama, Japan; Erich F. Klementich; Jeffrey K. Bouche, both of Houston, Tex.

[73] Assignees: NKK Corporation, Tokyo, Japan; Marubeni Tubulars, Inc., Houston, Tex.

[21] Appl. No.: 850,744

[22] Filed: Mar. 13, 1992

[51] Int. Cl.⁵ ............................................. F16L 25/00
[52] U.S. Cl. ..................................... 285/334; 29/407
[58] Field of Search .............. 285/333, 334, 355, 390, 285/93; 29/407

[56] References Cited

U.S. PATENT DOCUMENTS

| | | | |
|---|---|---|---|
| 2,177,100 | 10/1939 | Frame | 285/146 |
| 2,772,102 | 11/1956 | Webb | 285/334 |
| 3,083,043 | 3/1963 | Thornhill | 285/333 |
| 3,109,672 | 11/1963 | Franz | 285/334 |
| 3,109,672 | 11/1963 | Franz | 285/334 |
| 4,127,927 | 12/1978 | Hauk et al. | 285/333 X |
| 4,317,585 | 3/1982 | Boice | 285/333 X |
| 4,384,737 | 5/1983 | Reusser | 285/334 |
| 4,384,737 | 5/1983 | Reusser | 285/334 |
| 4,614,120 | 9/1986 | Fradin et al. | 285/93 X |
| 4,796,928 | 1/1989 | Carlin et al. | 285/334 |
| 4,962,579 | 10/1990 | Moyer et al. | 285/93 X |
| 5,040,827 | 8/1991 | DeLange | 285/93 X |

FOREIGN PATENT DOCUMENTS

| | | | |
|---|---|---|---|
| 0104720 | 4/1984 | European Pat. Off. | |
| 2074685A | 11/1981 | United Kingdom | F16L 15/00 |

*Primary Examiner*—Dave W. Arola
*Attorney, Agent, or Firm*—Conley, Rose & Tayon

[57] ABSTRACT

The present invention pertains to an improvement in buttress-threaded tubular connections. In particular, the connection is improved by controlling the tubular member thread pitch diameter tolerance to ±0.0015 inch, to provide a thread bearing contact pressure which is relatively constant over the entire length of the connection. In addition, the improved connection provides a reduction in hoop stress of about 20% over known buttress-threaded tubing connections.

The present invention typically includes the use of variable make-up in combination with the control of the tubular member thread pitch diameter tolerance.

22 Claims, 5 Drawing Sheets

BUTTRESS-THREADED TUBULAR CONNECTION

BACKGROUND OF THE INVENTION

1. Field of the Invention

The present invention pertains to an improvement in buttress-threaded tubular connections. In particular, the connection is improved by controlling a particular combination of dimensional tolerances of the connection thread elements in a manner which provides a thread bearing contact pressure which is relatively constant over the entire length of the connection. In addition, the improved connection provides a reduction in hoop stress of about 20% over known buttress-threaded tubing connections machined to existing industry standard tolerances.

2. Background of the Invention

Threaded connections joining discreet lengths of steel pipe are used in many applications. The art of tubular connections is particularly well established for steel pipe used in the forms of tubing, casing, and drill pipe in the oil and gas well industry, and known collectively as oil country tubular goods (OCTG). There are numerous patents related to oil country tubular goods.

Oil and gas exploration and production companies have continued to expand the boundaries of depth, pressure, corrosive nature of fluid produced, and perhaps most important, economic criteria used to justify well development. These factors contribute to more stringent requirements for the material properties of the steel tubes used and the connections which join those tubes. For example, thirty years ago, users considered steel with yields of 80,000 psi to be high strength steel. Today, users routinely employ such steels and consider yields of 125,000 psi and higher not uncommon. Thus, it has become important to adjust connection attributes to function better in combination with the steels available today and under the production conditions and economic conditions of today.

Thirty years ago, at the time buttress threaded connections (joints) were improved to reduce the hoop stress developed toward the ends of connections or couplings, the machining of the connections was typically carried out using "chaser" type manual machine tools to achieve mass-production economies. Today, the development of computer-numerically-controlled (CNC) machines has led to the utilization of "single-point" cutting tools able to mass produce metal shapes. These CNC machines have the capability of far more accurately, and repeatedly, reproducing the intended design dimensions of any given connection. Coupled with advances in other technologies, such as precision measuring instruments, anti-galling metal treatments, and sophisticated assembly equipment, one can deliver a vastly improved product compared to the ones previously produced.

The goal of connection designers has been to develop connections capable of performing under demanding mechanical conditions which place the connection under high stresses, while providing a reliable seal against leakage of fluids through (across the threads of) the connection. In addition, it is highly desirable that the assembled connections be capable of being broken apart and reassembled without a significant reduction in performance characteristics of the connection.

U.S. Pat. No. 2,177,100 to William M. Frame, issued Oct. 24, 1939 discloses a leak-resistant pipe joint thread comprising a threaded female member, a complementary threaded male member engaging in threaded relation with the female member, and means providing a plurality of helically extending line seals between substantially each of the mating threads of the members. Preferably, the load flanks (trailing flanks) of the thread on the male and female members are surfaces bearing against each other, while clearances exist between at least portions of the remaining thread surfaces. The helically extending line seals are provided by a plurality of helically extending raised ribs on each root surface of the threads of the male and female members. Such raised ribs can be used on all thread surfaces other than the bearing load flank thread surfaces, if desired.

U.S. Pat. No. 2,772,102 to Samuel Webb, issued Nov. 27, 1956, describes a sealed, threaded pipe joint. The pipe joint comprises a "tapered non-upset, threaded connection characterized by 100% efficiency resulting solely from the screw-threaded contact". The joint comprises an internally threaded coupling member and an externally threaded pipe end member, the threads on each member having load-bearing and non-load-bearing flanks when tensile stresses are applied to the joint. In particular, the threads of the joint have a difference in phase, whereby a load-bearing flank of the pipe threads is in sealing engagement with a load-bearing flank of the coupling threads and a non-load-bearing flank of the pipe threads is in sealing engagement with a non-load-bearing flank of the coupling threads at points spaced apart a distance greater than the width of a fully formed thread but within the length of the fully formed threads. The combination of the pipe and coupling threads are substantially complementary and have fiat crests and roots, the threads being narrower than the thread grooves. The load-bearing flanks of the pipe and coupling threads are substantially normal to the longitudinal axis of the pipe and coupling. The roots and crests of the coupling threads are parallel to each other and on a taper relative to the longitudinal axis of the connection throughout the length thereof. The roots of the pipe threads are parallel to the roots and crests of the coupling and are on a taper relative to the longitudinal axis of the connection, throughout the length of the pipe threads; however, the crests of the pipe threads are parallel to the roots of the pipe threads for only a portion of the length of the pipe thread, providing a plurality of fully formed threads and vanishing threads, with the vanishing threads being at the junction with the unthreaded portion of the pipe. The crests of the coupling threads are parallel to the roots of the pipe threads and the roots of the coupling threads are parallel to the crests of the fully formed pipe threads, the mating threads on the coupling being at least as long as the total length of fully formed and vanishing threads on the pipe. The entire surface of the fiat crests of the coupling threads are in engagement with the roots of the pipe threads throughout the full length of the fully formed and vanishing pipe threads; the entire surface of the fiat crests of the pipe threads are in engagement with roots of the coupling threads throughout the full length of the fully formed threads on the pipe.

U.S. Pat. No. 3,109,672 to William F. Franz, issued Nov. 5, 1963 describes buttress threaded joints for oil well tubing which provide a drop in the hoop stress development toward the end of the joint coupling during power-make-up, permitting the safe use of higher working stresses. In particular, the threaded connection (pipe joint) disclosed comprises a pipe member having a cylindrical outer surface and a tapered buttress thread at the end thereof. The tapered buttress thread vanishes along the outer cylindrical surface of the pipe, providing a length of fully formed and a length of vanishing threads. The connection member corresponding with the threaded pipe member is a coupling member having a complementary thread on the internal surface thereof, the complementary thread being fully formed throughout the length thereof and at least as long as the total length of fully formed and vanishing threads on the pipe. The complementary threads on each connection member have following-flanks in bearing relationship and substantially normal to the longitudinal axis of the joint and leading-flanks in bearing relationship, wherein the leading-flanks have a larger flank-angle than the following flanks.

In particular, the following-flanks have a flank angle ranging between 0 degrees and 8 degrees for steel having a yield of 80,000 psi and greater and a flank angle ranging between 0 degrees and 1 degree for steel having a yield strength below 80,000 psi. The leading-flanks have a flank angle ranging between 30 degrees and 50 degrees, and preferentially an angle of about 45 degrees. This leading-flanks angle is necessary to prevent leakage of fluids (particularly gases) through (across the threads of) the connection, for reasons which will be discussed subsequently herein.

The thread crest and root truncations provide flat crests and roots which are parallel to the longitudinal axis of the joint, wherein the crest truncations of fully formed threads exceed the root truncations by an amount providing voids of predetermined amount between the crests and roots of the complementary threads throughout the length of the joint when the pipe and coupling are in hand-tight engagement. The crests of the coupling threads engage the roots of the vanishing pipe threads after power make-up of the joint to tightness, but the voids between the crests and roots of fully formed threads remain after the power make-up, and the initial voids between the coupling threads and vanishing pipe threads prevent the development of deleterious hoop stresses at the end of the coupling during power make-up.

The crest truncations of the fully formed threads exceed the root truncations by an amount providing voids of at least 0.002 inch. The voids cannot exceed 0.005 inches for oil well service wherein liquids only are involved and cannot exceed 0.0035 (preferably 0.003) when the fluid to be handled is predominantly gas. Since a void of 0.003 will achieve all of the objectives of the Franz invention, this was the amount of clearance void recommended. Use of a crest-root void of 0.003 inch between members results in at least about a 30% decrease in the diametrical interference developed at the end of the coupling.

Despite the desire to obtain clearance voids of 0.003 inch between fully formed complementary member threads, the machining techniques available at the time of the invention did not permit such accuracy in machined thread dimensions. For example, for a thread lead-flank angle of about 13 degrees, each 0.001 inch narrowing of the thread due to wear of the chaser tool decreased the crest root clearance by 0.0044 inch (a reduction exceeding the entire desired clearance void of 0.003 inch). This fact made use of a leading flank angel of 13 degrees impractical. Thus, the inventor recommended a leading flank angle of 45 degrees, since the loss in clearance void per each 0.001 inch of narrowing is only 0.0010 inch.

The specific threaded connection, described in U.S. Pat. No. 3,109,672 and commonly available throughout the world as a de-facto standard, uses a taper of 1 inch diametrical change for each 16 inches of longitudinal change (0.0625 inch per inch). The threads mate on the flanks rather than on root or crest, with the preferred embodiment of the invention exhibiting a thread form with roots and crests parallel to the longitudinal axis of the tube. The threads have a negative leading-flank angle (stab flank angle) of 45 degrees and a following-flank angle (load flank angle) of about zero degrees. These angles are defined in the geometric terms, which are subsequently used to describe the present invention. Under these geometric terms, a thread "flank angle" is understood to mean the angle formed between the thread flank and a line constructed at the root of the thread flank, which line is perpendicular to the longitudinal axis of the connection. For an externally threaded tubular member with increasing taper from right to left, a negative angle is one wherein rotation of the perpendicular line toward the thread flank is in a counterclockwise direction. A positive angle is one wherein the rotation is clockwise. These geometric terms do not comport with the terms used to describe flank angles in U.S. Pat. No. 3,109,672.

Problems have been encountered with the threaded connection of U.S. Pat. No. 3,109,672, because of unacceptably high levels of stress within the connection after make-up, due to interference during make-up between complementary member thread roots and crests. Frequently there is galling within the threads during make-up. In addition, secondary fluid leakage paths are created within the connection due to the galling within threads during make-up and the high levels of stress within the connection after make-up. When the amount of clearance between complementary member threads is increased to avoid the problems just discussed, more clearance than 0.006 diametric inch (0.003 inch per member thread) can result, and the pressure resistance capabilities of thread lubricant can be exceeded, rendering the connection unsuitable for service as a gas-tight connection. When the clearance exceeds 0.010 diametric inch, the connection will not even contain liquids.

SUMMARY OF THE INVENTION

Figure 1:
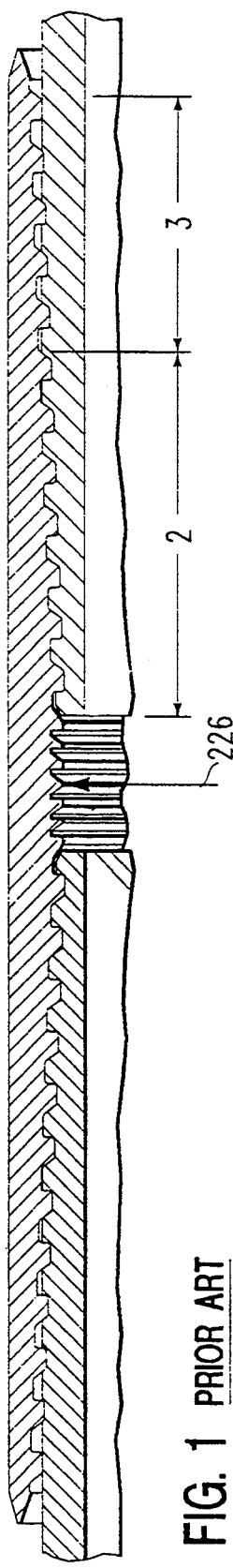
FIG. 1 is a schematic showing a longitudinal cross-section of the threaded tubing joint of U.S. Pat. No. 3,109,672.

In accordance with the present invention, a tube and coupling connection comprising a pipe member having a cylindrical outer surface and a tapered buttress thread at the end thereof is disclosed. In particular the connection comprises a pipe member having a cylindrical outer surface and a tapered thread at the end thereof, which thread vanishes along the outer cylindrical surface of the pipe, providing a length of fully formed and a length of vanishing threads. The connection member corresponding with the threaded pipe member is a coupling member having a complementary thread on the internal surface thereof, the complementary thread being fully formed throughout the length thereof and at least as long as the total length of fully formed and vanishing threads on the pipe.

The improvement of the present invention over the known art resides in controlling the dimensional tolerances of both the tubular member and coupling member pitch diameters. Control of pitch diameter tolerance requires control of a particular combination of connection thread elements. Control of tubular member pitch diameter provides a thread bearing contact pressure which is relatively constant over the entire length of the connection and a minimum thread bearing contact pressure which is relatively constant for connections having a tubular outside diameter (OD) ranging from about 2⅜ inch to about 7 inch.

For example, the minimum thread bearing contact pressure (based on finite element analysis) for a connection of the present invention which comprises a 2⅜ inch OD tubular (pipe) used in combination with corresponding regular size coupling, ranges from about 6,700 psi to about 7,600 psi over the entire length of the connection; the maximum thread bearing contact pressure for the same 2⅜ inch tubular/coupling connection ranges from about 20,500 psi to about 23,400 psi. The difference between minimum and maximum thread bearing contact pressures is a function of the minimum and maximum thread profile interferences, which are a function of the amount of make-up travel of the assembled connection and the dimensional tolerances of the machined thread profile of the connection.

The thread bearing contact pressure for the present invention 2⅜ inch tubular/with regular coupling connection compares with a thread bearing contact pressure for the present invention 4½ inch OD tubular/with regular coupling connection, which exhibits a minimum contact pressure ranging from about 7,100 psi to about 7,900 psi and a maximum contact pressure ranging from about 12,600 psi to about 14,000 psi.

When the particular combination of thread dimensional tolerances are controlled as described in the present invention, the thread bearing contact pressure remains relatively constant throughout the length of the connection, with the nominal contact pressure being dependent for the most part upon the amount of make-up travel of the assembled connection. In addition, the present invention has provided control of the minimum thread bearing contact pressure over a relatively narrow range for connections constructed from tubulars having an OD ranging from about 2⅜ inches to about 7 inches.

To obtain the substantially constant thread bearing contact pressure over the entire length of the connection, it is necessary to maintain thread element tolerances of the kind provided below.

Table 1 shows the thread dimensions of typical connections of the kind to which the present invention can be applied and includes examples of present invention variable make-up. These dimensions are applicable to connections machined to industry standards regarding thread pitch (8 threads per inch) and thread taper (1/16 on diameter). One skilled in the art, in view of disclosure of the present invention, could apply the thread dimensional tolerances and variable make-up of the present invention to threads having a different thread pitch and/or thread taper. However, due to the desire for interchangability within the industry, the preferred embodiment of the present invention wherein the thread pitch and taper are as described above is likely to become the industry standard.

Table 2 shows the dimensional tolerances of the thread pitch diameter and related thread elements which are applied to connections of the kind described in Table 1, to provide the threaded connections of the present invention.

The abbreviations used in Tables 1 and 2 below are intended to correspond with those commonly used in the industry; however, in the event of any question regarding interpretation, these abbreviations should be used in combination with FIG. 1 which is particularly marked to identify the dimensions of the connection represented by the abbreviations.

TABLE 1

| THREAD DIMENSIONS OF TUBING | | | |
|---|---|---|---|
| TUBULAR OR "PIN" | | | |
| TOTAL THREAD LENGTH | PERFECT THREAD LENGTH | PITCH DIAMETER | LENGTH, END OF PIPE TO START OF MAKE-UP WINDOW |

TABLE 1-continued

THREAD DIMENSIONS OF TUBING

| PIPE OD inch | L4 inch | L7 inch | E7 inch | A1 inch |
|---|---|---|---|---|
| 2⅜ | 3.625 | 2.000 | 2.337 | 3-25/32 |
| 2⅞ | 3.625 | 2.000 | 2.837 | 3-13/16 |
| 3½ | 3.625 | 2.000 | 3.462 | 3⅞ |
| 4½ | 4.125 | 2.500 | 4.462 | 4⅞ |

COUPLING

| | OD (W) | | | BEVEL DIAMETER | |
|---|---|---|---|---|---|
| PIPE OD inch | REGULAR inch | SPECIAL CLEARANCE inch | LENGTH NL inch | REGULAR Bf inch | SPECIAL CLEARANCE Bf inch |
| 2⅜ | 2.875 | 2.700 | 8½ | 2.615 | 2.535 |
| 2⅞ | 3.500 | 3.220 | 8½ | 3.175 | 3.040 |
| 3½ | 4.250 | 3.865 | 8½ | 4.365 | 4.190 |
| 4½ | 5.200 | 4.920 | 9½ | 4.840 | 4.700 |

TABLE 2

TOLERANCE OF THREAD ELEMENTS

| ITEM | LOCATION | TOLERANCE (inches) |
|---|---|---|
| PIN TAPER (per 1 inch) | Perfect thread | ±0.0015 |
| | Perfect-Imperfect | ±0.0015 |
| | Imperfect thread | ±0.0015 |
| COUPLING TAPER (per 1 inch) | Perfect thread | ±0.0015 |
| | Perfect-Imperfect | ±0.0015 |
| | Imperfect thread | ±0.0015 |
| LEAD | Perfect thread/inch | ±0.001 |
| | Total (for entire length of thread) | ±0.002 |
| HEIGHT | Perfect thread | ±0.001 |
| RUN-OUT (Vanishing thread root) | A1 + 0.312 or last thread root | ±0.005 −∞ |
| PITCH DIAMETER VARIATION | within the perfect thread | ±0.0015 |
| MAKE-UP WINDOW, MINIMUM POWER-TIGHT POSITION | A1 | ±0.020 |

The threaded tubular connection of the present invention utilizes thread having load bearing flanks at both the leading-flank (stab flank) and the following-flank (load flank). A clearance void is present between the crests and roots of complementary (mating) full height threads of connection members. The thread profile of each connection member is machined to dimensional tolerances such that the fully formed complementary threads have a clearance void between mating crests and roots which ranges from slightly greater than 0.000 inches to less than 0.0035 inches. The known art requires a clearance void ranging between 0.002 inches and 0.005 inches to provide relief of the diametrical interference developed at the end of the coupling during power make-up. Smaller clearance voids, of the kind described above for the present invention can be used when the diametrical interference is reduced by controlling the combination of thread element tolerances listed above.

The preferred clearance void between complementary crests and roots of the full height threads of the present invention ranges from slightly greater than 0.000 inches to less than 0.003 inches. Since present machining technology permits control of thread parameters (height, taper, lead error, and pitch diameter) to within ±0.001 inch, the clearance void can be controlled within the preferred range of the present invention to provide improved connection leak integrity, particularly regarding gases. Diametrical interference is not a problem even when the reduced clearance void range of slightly greater than 0.000 inches to less than 0.003 inches is used in the present invention, due to utilization of present machining capability for controlling thread element dimensional tolerances. In fact, the connection having the combination of dimensional tolerances specified in TABLE 2, above, enables control of the pitch diameter variation, taper variation, and lead error to the extent that power tight thread interference is decreased by about 0.004 diametric inch per inch along the pitch line. The improved dimensional tolerances permit a slight increase in coupling pitch diameter and decrease in complementary pin pitch diameter, while maintaining sufficient beating loads to ensure pressure integrity. This increase in coupling pitch diameter and decrease in pin pitch diameter reduces hoop stress and the possibility of galling. This provides a reduction in hoop stress levels of about 20% over the entire length of the connection.

Another improvement of the present invention over the known art resides in the use of a variable make-up which is directly related to the connection tubular diameter, as evidenced in Table 1 under "LENGTH, END OF PIPE TO START OF MAKE-UP WINDOW" (A1). In the previously known art, typically a standard make-up of 2½ turns was used regardless of tube OD. Some literature sources recommended an increase in make-up length (increased number of turns) for larger tube diameters; however, any such increase in make-up was somewhat arbitrary and apparently not based on finite element analysis. The original buttress-threaded tubular connection using the standard make-up results in an excessive hoop stress in a 2⅜ inch tubular/coupling connection while providing inadequate thread bearing contact pressure in a 3½ inch and 4½ inch tubular/coupling connection. The tubular and coupling connection of the present invention, machined using CNC techniques known in the industry, provides for variable make-up which is dependent upon the tubular (pipe) OD. The number of turns per make-up is adjusted, depending on tubular OD, to control the amount of stress which is generated at the ends of the coupling upon make-up of the connection. Preferably, the make-up is adjusted to control the amount of hoop stress generated at the ends of the coupling to less than about 0.004 inches per inch strain.

In the present invention connection, the following-flank (load flank) angle, as previously described in geometric terms, can vary from 0 degrees to about 8 degrees, depending on the tubular and coupling steel, as described in U.S. Pat. No. 3,109,672 of W. F. Franz. However, the present invention permits the thread leading-flanks (stab flank) angle to be adjusted to provide improved performance. The tubular and coupling dimensional tolerances achieved using computer-numerically-controlled (CNC) machining techniques, combined with control of the combination of thread element tolerances of the present invention, permit the optional use of a lead-flank (stab flank) angle of between about 5 degrees and less than 30 degrees. In the past, the lead-flank angle ranged between 30 degrees and 50 degrees, preferably 45 degrees, to reduce the variation in void clearance which resulted from machining techniques. In the past, the designed full thread clearance void between crest and root ranged from at least 0.002 inch to about 0.005 inch. This designed clearance void, combined with machining variability, due to machine tool wear etc., resulted in the possibility of leakage through the connection. The present invention thread element tolerances specified above in TABLE 2 make it possible to use a leading-flank (stab flank) angle ranging from about 5 degrees to less than 30 degrees without fear of fluid leakage through the connection. Use of a leading-flank angle of less than 30 degrees increases the connection compressive strength, which is important particularly at the bottom of long strings of pipe set in deep wells.

DETAILED DESCRIPTION OF THE PREFERRED EMBODIMENTS

The present invention pertains to an improvement in buttress-threaded tubular connections. In particular, the connection is improved by controlling a particular combination of dimensional tolerances of the connection thread elements in a manner which provides a thread bearing contact pressure which is relatively constant over the entire length of the connection. In addition, the improved connection provides a reduction in hoop stress of about 20% over the entire length of the connection when compared with buttress-threaded tubing connections machined to previously existing industry standard tolerances.

FIG. 1 shows a cross-section of a threaded tubing joint of the kind described in U.S. Pat. No. 3,109,672. The joint is made up from two pieces of threaded tubing (pipe) and a coupling, as previously described. In particular, the threaded connection disclosed comprises a pipe member having a cylindrical outer surface and a tapered buttress thread at the end thereof. The tapered buttress thread vanishes along the outer cylindrical surface of the pipe, providing a length of fully formed threads 2 and a length of vanishing threads 3. The connection member corresponding with the threaded pipe member is a coupling member having a complementary thread on the internal surface thereof, the complementary thread being fully formed throughout the length thereof and at least as long as the total length of fully formed and vanishing threads on the pipe. The complementary threads on each connection member have following-flanks in bearing relationship and substantially normal to the longitudinal axis of the joint and leading-flanks in bearing relationship, wherein the leading-flanks have a larger flank angle than the following flanks. Typically the leading-flanks have a negative flank angle ranging between 30 degrees and 50 degrees, and preferably a negative angle of about 45 degrees. The angle is a negative angle under the geometric terms previously defined. The following-flanks may have a zero degree angle under the above-referenced geometric terms, or form a right angle with the longitudinal axis of the connection.

The buttress-threaded tubing connection of the present invention has the same basic structure as that shown in FIG. 1. However, the present invention connection is an improvement over the connection disclosed in U.S. Pat. No. 3,109,672 in that it exhibits a combination of dimensional tolerances of the connection thread elements which provides a thread bearing contact pressure which is relatively constant over the entire length of the connection. In addition, using the dimensional tolerances of the present invention, it is possible to use a leading-flanks angle of less than 30 degrees without the risk of fluid leakage through (across the threads of) the connection. Use of a leading-flanks angle of less than 30 degrees increases the connection compressive strength. The improved connection of the present invention also provides for variable make-up which is proportional to the connection tubular (pipe) diameter. The number of turns per make-up is adjusted, depending on tubular OD, to control the amount of stress which is generated at the ends of the coupling upon make-up of the connection.

Figure 2:
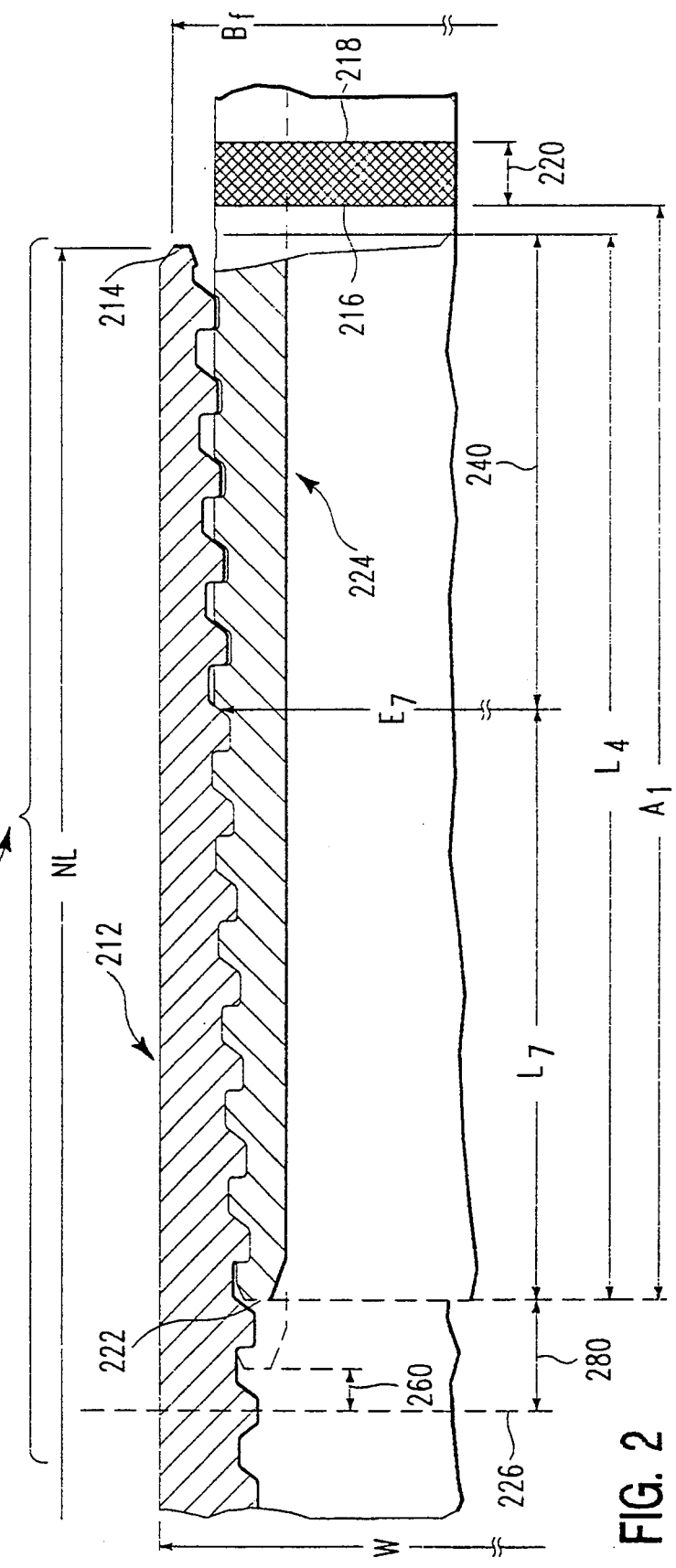
FIG. 2 is a schematic showing a tubular and coupling connection of the present invention, and in particular showing dimensional markings to be used in combination with Table 1 and Table 2 to provide definition of the thread element tolerances critical to the present invention.

FIG. 2 is a schematic showing the various dimensions used in description of the present invention. The following definitions apply to the dimensional features shown on FIG. 2.

NL is understood to mean the total coupling length.

W is understood to mean the OD (outside diameter) of the coupling.

Bf is understood to mean the bevel diameter of the coupling.

L7 is understood to mean the perfect thread length on a tubular (pipe) portion of the connection. The tubular is also referred to as the connection "pin" member.

Perfect thread is understood to refer to a full height thread profile.

E7 is understood to mean the thread pitch diameter as measured at the thread location on a tubular member where the perfect thread ends and imperfect thread begins.

Imperfect thread is understood to refer to a thread profile which exhibits less than full height thread.

Pitch diameter is understood to mean the diameter of the tubular at a location midway between the thread major diameter and the thread minor diameter. The pitch diameter locates the pitch line of the thread.

L4 is understood to mean the total thread length on the tubular (pin).

A1 is understood to mean the length from the leading edge of the pin to the mark on the pin member representing the position of the end of the coupling at minimum power tight make-up.

FIG. 2 shows a schematic representing one half of an assembled connection 200 which is in the hand-tight position. The connection is made-up to the minimum power tight position when the leading edge 214 of coupling member 212 reaches the location at the edge of the first scribed make-up mark, which corresponds with line 216. The connection is made-up to the maximum power fight position when coupling member 212 leading edge 214 reaches the location at the edge of the second scribed make-up mark, which corresponds with line 218. The distance between lines 216 and 218 is dimension 220, which represents the length of available make-up range within the power tight position. Subsequent tables pertaining to Hoop Stress and Contact Pressure as a function of the distance from the center of the coupling are with reference to minimum make-up position, nominal make-up position and maximum make-up position. Nominal make-up position is equal to minimum make-up position plus 0.156 inches and maximum make-up position is equal to minimum make-up position plus 0.312 inches. Preferably, the distance 220 between lines 216 and 218, the amount of available make-up, is about 0.25 inches.

Also, with reference to the data presented in the present application pertaining to connections having tubular (pipe) ODs ranging from 2⅜ inches to 4½ inches, the following constraints apply. The distance 280 between the leading edge 222 of pin member 224 and the vertical centerline 226 of coupling member 212, when the connection is in the hand-tight position, is nominally set at 0.750 inches. In addition, the distance 260 between the leading edge 222 of pin member 224 and the vertical centerline 226 of coupling member 212, when the connection is in the minimum power-tight position, is $$\frac{NL - 2A1}{2}$$

inches, wherein NL and A1 are as previously defined herein, due to the variable make-up of the present invention.

The present invention is applicable to connections having pipe ODs as large as about 7 inches. The data shown in the present application is for connections having pipe ODs up to about 4½ inches, since the smaller diameter connection benefits most in terms of performance upon implementation of the present invention. However, one skilled in the art, using finite element analysis techniques in combination with the thread element tolerances disclosed herein can extend application of the invention to connections having larger pipe ODs.

TABLE 1, which follows, can be used in combination with FIG. 1 to define the various dimensions applicable to the connection of the present invention, for connections having pipe ODs from about 2⅜ inch to about 4½ inch. References to Special Clearance couplings are understood to mean couplings having an OD (W), smaller than the Regular coupling, to provide a more slim-line connection.

TABLE 1

THREAD DIMENSIONS OF TUBING

TUBULAR OR "PIN"

| PIPE OD inch | TOTAL THREAD LENGTH L4 inch | PERFECT THREAD LENGTH L7 inch | PITCH DIAMETER E7 inch | LENGTH, END OF PIPE TO START OF MAKE-UP WINDOW A1 inch |
|---|---|---|---|---|
| 2⅜ | 3.625 | 2.000 | 2.337 | 3-25/32 |
| 2⅞ | 3.625 | 2.000 | 2.837 | 3-13/16 |
| 3½ | 3.625 | 2.000 | 3.462 | 3⅞ |
| 4½ | 4.125 | 2.500 | 4.462 | 4⅜ |

COUPLING

| PIPE OD inch | OD (W) REGULAR inch | OD (W) SPECIAL CLEARANCE inch | LENGTH NL inch | BEVEL DIAMETER REGULAR Bf inch | BEVEL DIAMETER SPECIAL CLEARANCE Bf inch |
|---|---|---|---|---|---|
| 2⅜ | 2.875 | 2.700 | 8¼ | 2.615 | 2.535 |
| 2⅞ | 3.500 | 3.220 | 8¼ | 3.175 | 3.040 |
| 3½ | 4.250 | 3.865 | 8¼ | 4.365 | 4.190 |
| 4½ | 5.200 | 4.920 | 9½ | 4.840 | 4.700 |

TABLE 2, which follows, provides a listing of the combination of thread element tolerances necessary to provide the improved, constant, thread-bearing contact pressures of the present invention connection, as well as the reduction in hoop stress of about 20% over known buttress-threaded tubing connections.

TABLE 2

TOLERANCE OF THREAD ELEMENTS

| ITEM | LOCATION | TOLERANCE (inches) |
|---|---|---|
| PIN TAPER (per 1 inch) | Perfect thread | ±0.0015 |
| | Perfect-Imperfect | ±0.0015 |

TABLE 2-continued

TOLERANCE OF THREAD ELEMENTS

| ITEM | LOCATION | TOLERANCE (inches) |
|---|---|---|
| | Imperfect thread | ±0.0015 |
| COUPLING TAPER | Perfect thread | ±0.0015 |
| (per 1 inch) | Perfect-Imperfect | ±0.0015 |
| | Imperfect thread | ±0.0015 |
| LEAD | Perfect thread/inch | ±0.001 |
| | Total (for entire length of thread) | ±0.002 |
| HEIGHT | Perfect thread | ±0.001 |
| RUN-OUT | A1 + 0.312 | ±0.005 |
| (Vanishing thread root) | or last thread root | −∞ |
| PITCH DIAMETER VARIATION | within the perfect thread | ±0.0015 |
| MAKE-UP WINDOW, MINIMUM POWER-TIGHT POSITION | A1 | ±0.020 |

Figure 3A:
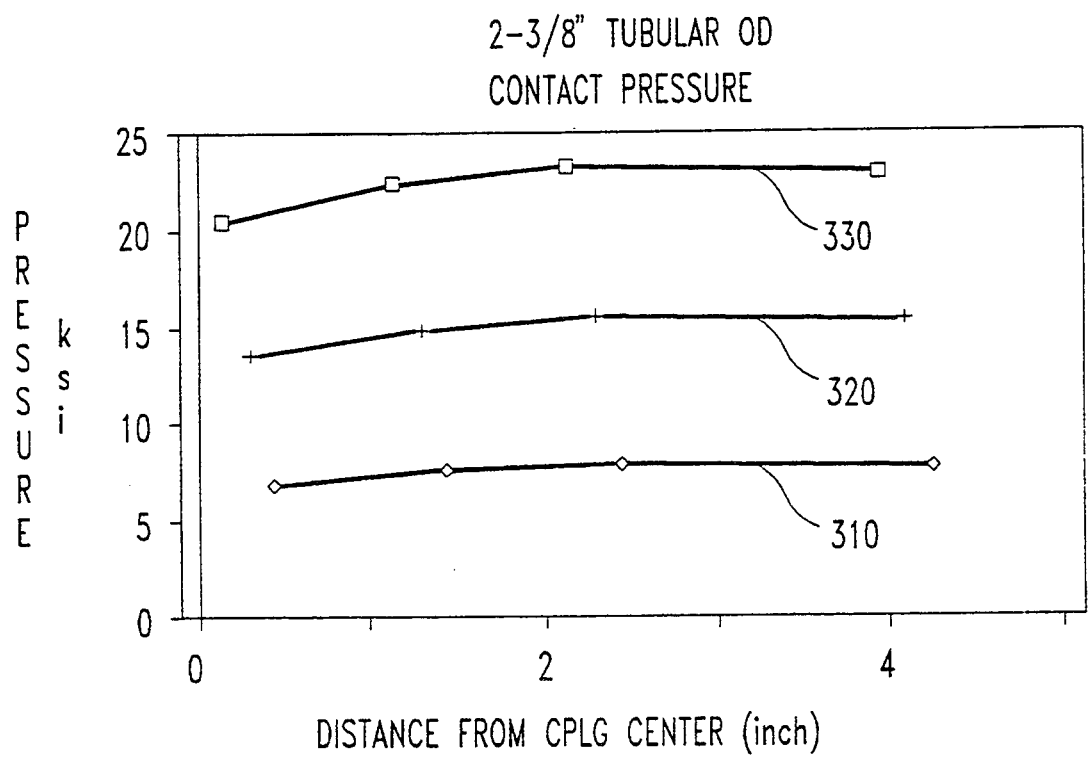
FIG. 3A is a graph showing bearing surface contact pressure as a function of distance from the coupling center for a connection of the present invention having pipe (tubular) outside diameter (OD) of 2⅜ inches.
Figure 3B:
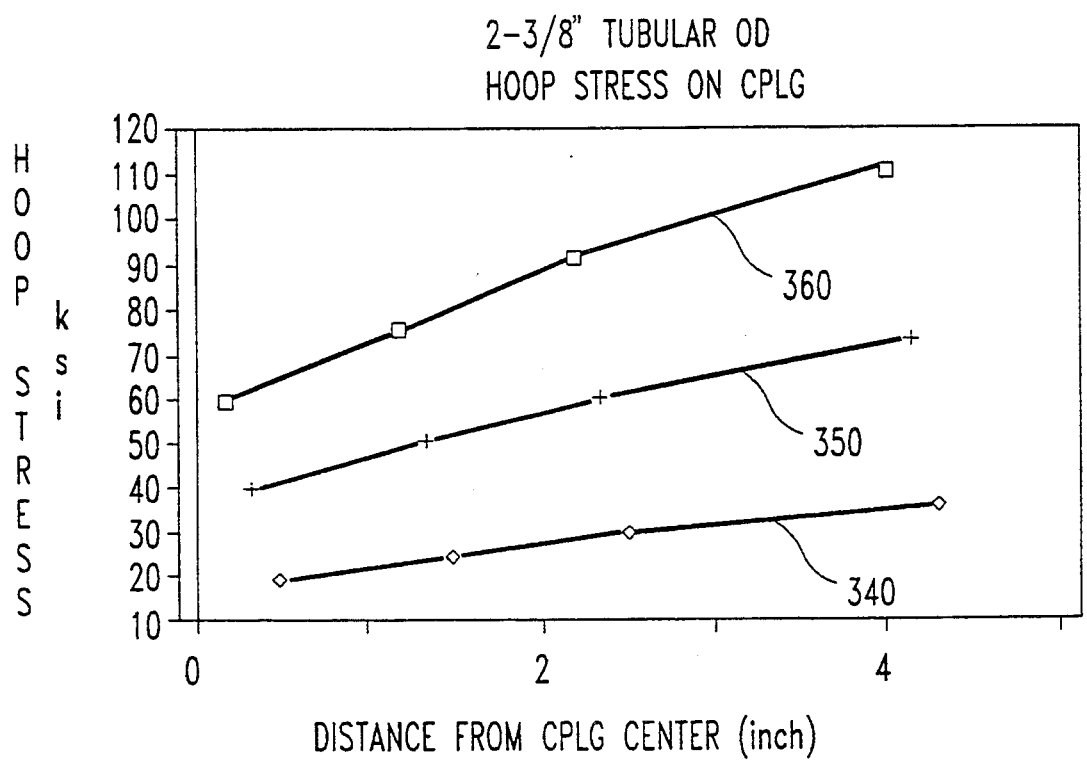
FIG. 3B is a graph showing hoop stress on the connection coupling as a function of distance from the coupling center for a connection of the present invention having a pipe OD of 2⅜ inches and a regular coupling OD of 2⅞ inches.

FIGS. 3A and 3B show stress analysis results for a connection of the present invention having a 2⅜ inch tubular (pipe) OD, with corresponding coupling OD as shown in corresponding TABLE 3, which follows.

FIG. 3A shows bearing contact pressure as a function of distance from the coupling centerline 226 toward either end of the threaded connection. The data shown in FIG. 3A corresponds with the data presented in TABLE 3.

FIG. 3B shows hoop stress as a function of distance from the coupling centerline 226 toward either end of the connection. The data shown in FIG. 3B correspond with the data presented in TABLE 3.

TABLE 3

CONTACT PRESSURE & HOOP STRESS

| 2⅜" TUBULAR THREAD INTRFNC MAKE-UP | | 0.190" TUBULAR WALL THICKNESS MAX MAX | | CPLG OD = 2⅞" NOM NOM | | A1 = 3-25/32" MIN MIN | |
|---|---|---|---|---|---|---|---|
| DISTANCE FRM CENTER in | INTFNC in | CONTACT PRESS psi | HOOP STRESS psi | CONTACT PRESS psi | HOOP STRESS psi | CONTACT PRESSURE psi | HOOP STRESS psi |
| 0.125 | 0.020 | 20539 | 59859 | | | | |
| 0.281 | 0.013 | | | 13605 | 39476 | | |
| 0.437 | 0.006 | | | | | 6730 | 19441 |
| 1.125 | 0.020 | 22589 | 75941 | | | | |
| 1.281 | 0.013 | | | 14998 | 50183 | | |
| 1.437 | 0.006 | | | | | 7436 | 24765 |
| 2.125 | 0.020 | 23407 | 91644 | | | | |
| 2.281 | 0.013 | | | 15566 | 60638 | | |
| 2.437 | 0.006 | | | | | 7730 | 29963 |
| 3.938 | 0.020 | 22944 | 111256 | | | | |
| 4.094 | 0.013 | | | 15284 | 73694 | | |
| 4.25 | 0.006 | | | | | 7603 | 36455 |

Figure 4A:
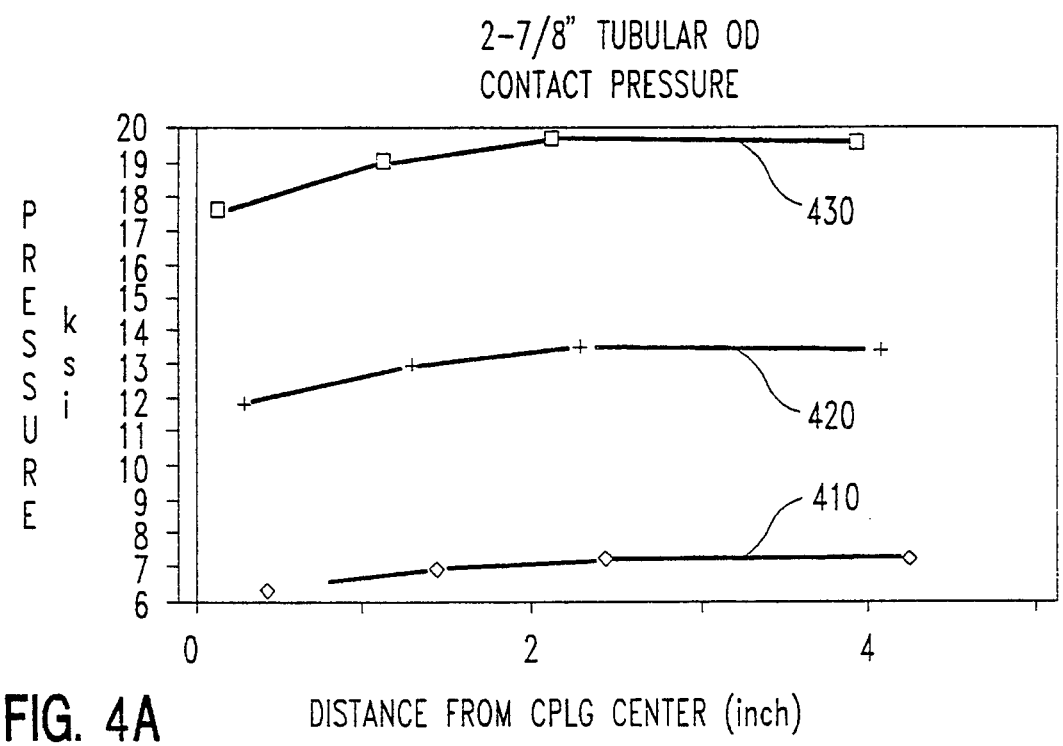
FIG. 4A is a graph showing bearing surface contact pressure as a function of distance from the coupling center for a connection of the present invention having a pipe OD of 2⅜ inches.
Figure 4B:
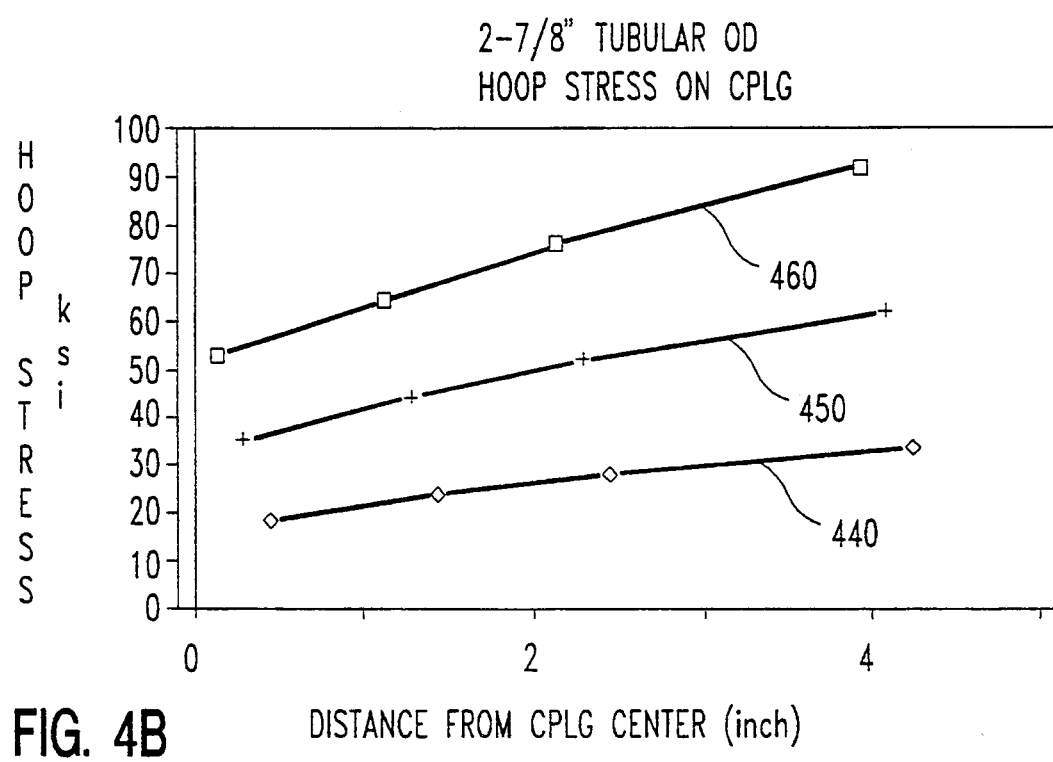
FIG. 4B is a graph showing hoop stress on the connection coupling as a function of distance from the coupling center for a connection of the present invention having a pipe OD of 2⅜ inches and a regular coupling OD of 3½ inches.

FIGS. 4A and 4B show stress analysis results for a connection of the present invention having a 2⅞ inch tubular (pipe) OD, with corresponding coupling OD as shown in corresponding TABLE 4, which follows.

FIG. 4A shows bearing contact pressure as a function of distance from the coupling center. The data shown in FIG. 4A correspond with the data presented in TABLE 4.

FIG. 4B shows hoop stress as a function of distance from the coupling center. The data shown in FIG. 4B correspond with the data presented in TABLE 4.

TABLE 4

CONTACT PRESSURE & HOOP STRESS

| 2⅞" TUBULAR THREAD INTRFNC MAKE-UP | | 0.217" TUBULAR WALL THICKNESS MAX MAX | | CPLG OD = 3.500" NOM NOM | | A1 = 3-13/16" MIN MIN | |
|---|---|---|---|---|---|---|---|
| DISTANCE FRM CENTER in | INTFNC in | CONTACT PRESS psi | HOOP STRESS psi | CONTACT PRESS psi | HOOP STRESS psi | CONTACT PRESSURE psi | HOOP STRESS psi |
| 0.125 | 0.021 | 17650 | 53237 | | | | |
| 0.281 | 0.014 | | | 11975 | 35985 | | |
| 0.437 | 0.007 | | | | | 6336 | 18970 |
| 1.125 | 0.021 | 19064 | 64728 | | | | |
| 1.281 | 0.014 | | | 12954 | 43812 | | |
| 1.437 | 0.007 | | | | | 6865 | 23128 |
| 2.125 | 0.021 | 19753 | 75995 | | | | |
| 2.281 | 0.014 | | | 13438 | 51486 | | |
| 2.437 | 0.007 | | | | | 7130 | 27205 |

TABLE 4-continued

| 2⅜" TUBULAR THREAD INTRFNC MAKE-UP | | 0.217" TUBULAR WALL THICKNESS MAX MAX | | CPLG OD = 3.500" NOM NOM | | A1 = 3-13/16" MIN MIN | |
|---|---|---|---|---|---|---|---|
| DISTANCE FRM CENTER in | INTFNC in | CONTACT PRESS psi | HOOP STRESS psi | CONTACT PRESS psi | HOOP STRESS psi | CONTACT PRESSURE psi | HOOP STRESS psi |
| 3.938 | 0.021 | 19708 | 90468 | | | | |
| 4.094 | 0.014 | | | 13424 | 61347 | | |
| 4.25 | 0.007 | | | | | 7131 | 32444 |

Figure 5A:
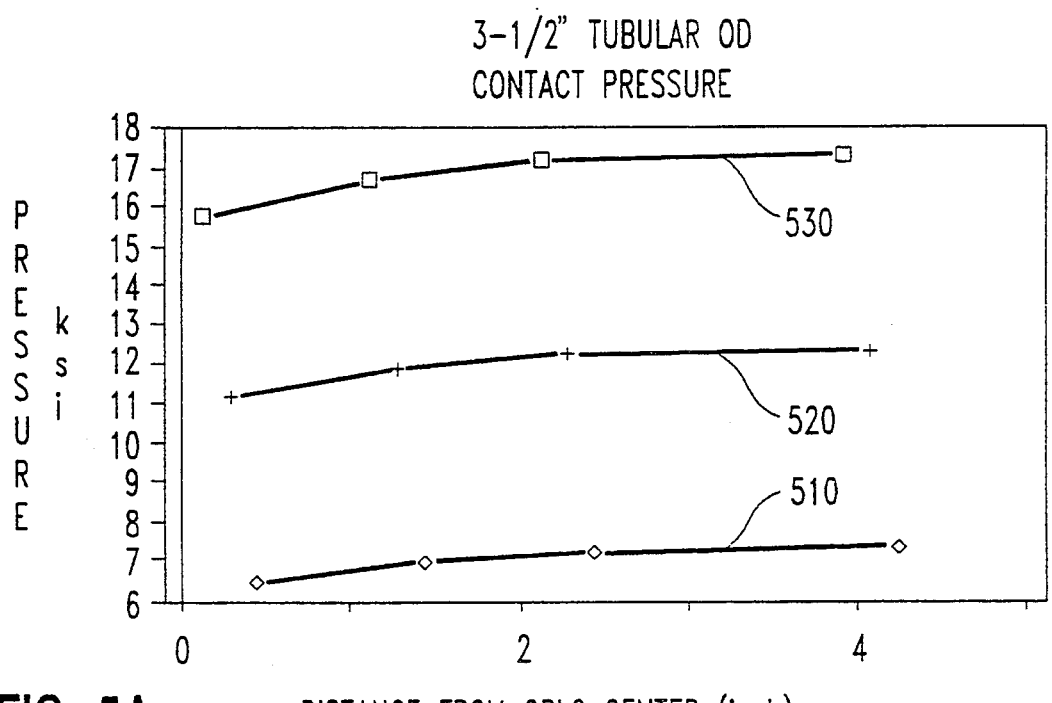
FIG. 5A is a graph showing bearing surface contact pressure as a function of distance from the coupling center for a connection of the present invention having a pipe OD of 3½ inches.
Figure 5B:
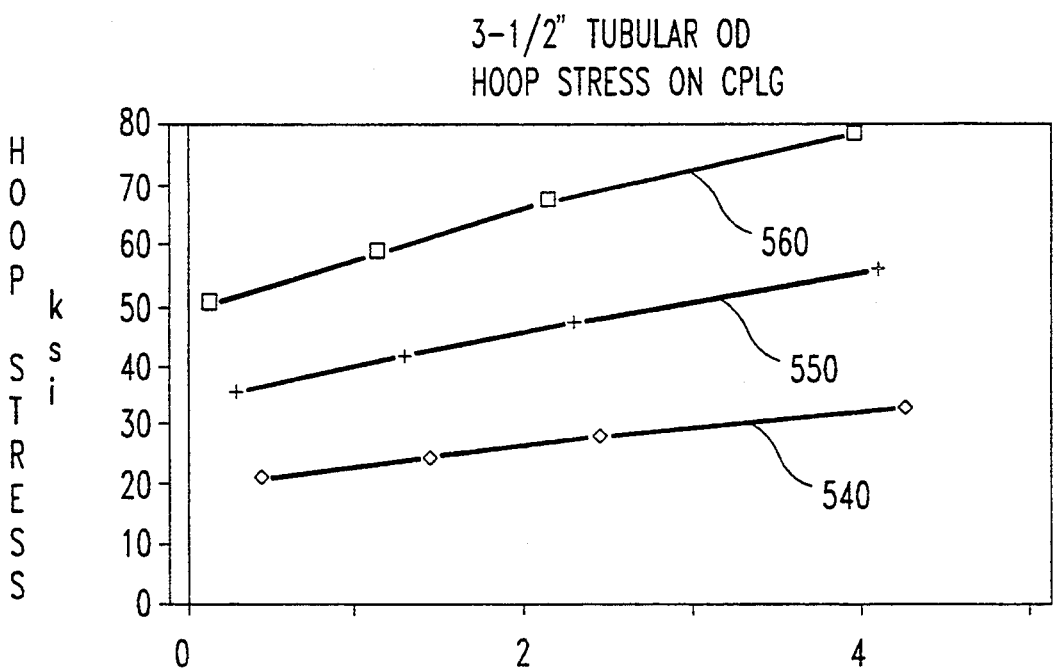
FIG. 5B is a graph showing hoop stress on the connection coupling as a function of distance from the coupling center for a connection of the present invention having a pipe OD of 3½ inches and a regular coupling OD of 4¼ inches.

FIGS. 5A and 5B show stress analysis results for a connection of the present invention having a 3½ inch tubular (pipe) OD, with corresponding coupling OD as shown in corresponding TABLE 5, which follows.

Figure 6A:
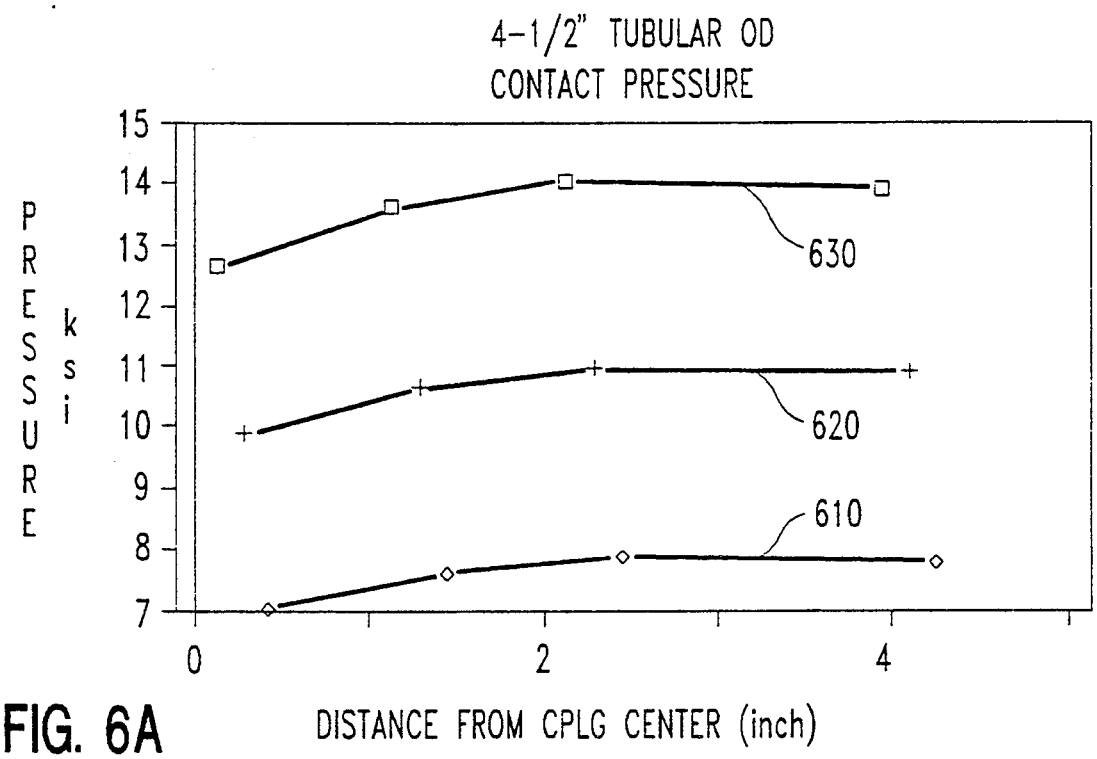
FIG. 6A is a graph showing bearing surface contact pressure as a function of distance from the coupling center for a connection of the present invention having a pipe OD of 4½ inches.

FIG. 5A shows bearing contact pressure as a function of distance from the coupling center. The data shown in FIG. 5A correspond with the data presented in FIG. 6A shows bearing contact pressure as a function of distance from the coupling center. The data shown in FIG. 6A correspond with the data presented in TABLE 6.

Figure 6B:
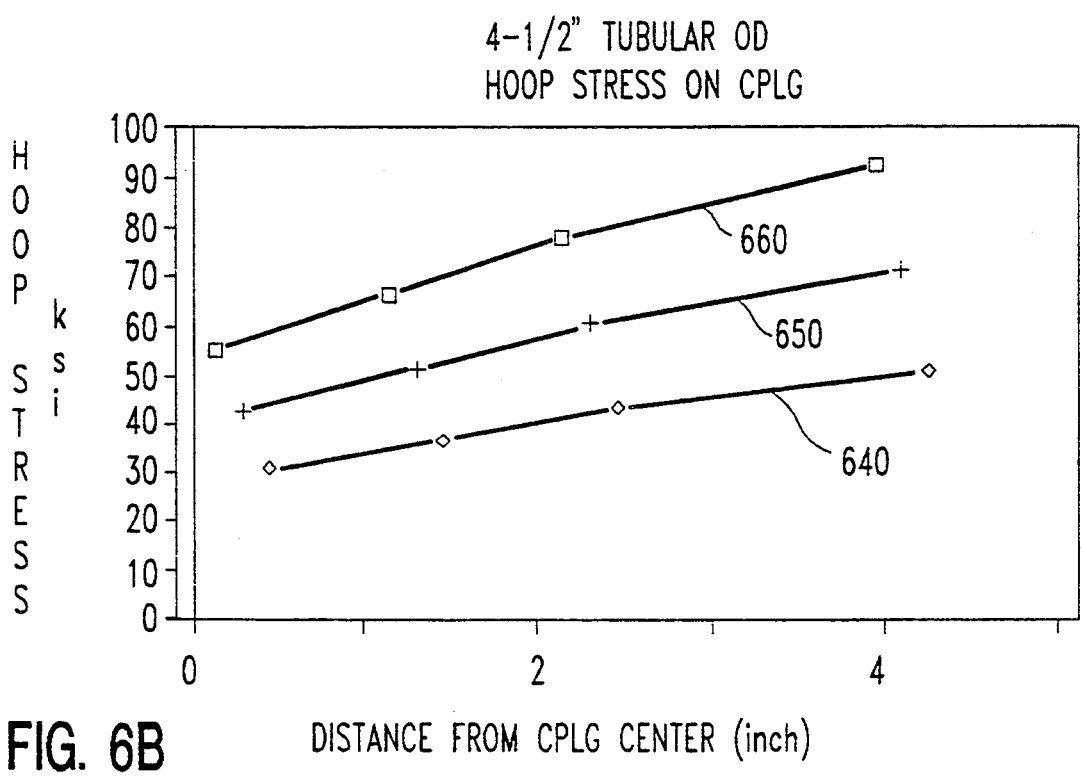
FIG. 6B is a graph showing hoop stress on the connection coupling as a function of distance from the coupling center for a connection of the present invention having a pipe OD of 4½ inches and a regular coupling OD of 5½ inches.

FIG. 6B shows hoop stress as a function of distance from the coupling center. The data shown in FIG. 6B correspond with the data presented in TABLE 6.

TABLE 6

| 4½" TUBULAR THREAD INTRFNC MAKE-UP | | 0.271" TUBULAR WALL THICKNESS MAX MAX | | CPLG OD = 5.200" NOM NOM | | A1 = 4⅞" MIN MIN | |
|---|---|---|---|---|---|---|---|
| DISTANCE FRM CENTER in | INTFNC in | CONTACT PRESS psi | HOOP STRESS psi | CONTACT PRESS psi | HOOP STRESS psi | CONTACT PRESSURE psi | HOOP STRESS psi |
| 0.125 | 0.031 | 12656 | 55369 | | | | |
| 0.281 | 0.024 | | | 9894 | 42963 | | |
| 0.437 | 0,017 | | | | | 7056 | 30690 |
| 1.125 | 0.031 | 13623 | 67160 | | | | |
| 1.281 | 0.024 | | | 10615 | 52166 | | |
| 1.437 | 0.017 | | | | | 7614 | 37303 |
| 2.125 | 0.031 | 14056 | 78763 | | | | |
| 2.281 | 0.024 | | | 19063 | 61222 | | |
| 2.437 | 0.017 | | | | | 7872 | 43811 |
| 3.938 | 0.031 | 13908 | 93583 | | | | |
| 4.094 | 0.024 | | | 10859 | 72790 | | |
| 4.250 | 0.017 | | | | | 7805 | 52124 |

TABLE 5.

FIG. 5B shows hoop stress as a function of distance from the coupling center. The data shown in FIG. 5B correspond with the data presented in TABLE 5.

As previously submitted, one skilled in the art can prepare equivalent data for larger tubular connection sizes. The data presented herein is for tubular (pipe) sizes 2⅜ inch OD to 4½ inch OD, wherein the advan-

TABLE 5

| 3½" TUBULAR THREAD INTRFNC MAKE-UP | | 0.254" TUBULAR WALL THICKNESS MAX MAX | | CPLG OD = 4¼" NOM NOM | | A1 = 3⅞" MIN MIN | |
|---|---|---|---|---|---|---|---|
| DISTANCE FRM CENTER in | INTFNC in | CONTACT PRESS psi | HOOP STRESS psi | CONTACT PRESS psi | HOOP STRESS psi | CONTACT PRESSURE psi | HOOP STRESS psi |
| 0.125 | 0.023 | 15765 | 50846 | | | | |
| 0.281 | 0.016 | | | 11120 | 35753 | | |
| 0.437 | 0,009 | | | | | 6497 | 20825 |
| 1.125 | 0.023 | 16688 | 59483 | | | | |
| 1.281 | 0.016 | | | 11783 | 41864 | | |
| 1.437 | 0.009 | | | | | 6892 | 24405 |
| 2.125 | 0.023 | 17175 | 67982 | | | | |
| 2.281 | 0.016 | | | 12137 | 47876 | | |
| 2.437 | 0.009 | | | | | 7104 | 27929 |
| 3.938 | 0.023 | 17214 | 79459 | | | | |
| 4.094 | 0.016 | | | 12176 | 55995 | | |
| 4.250 | 0.009 | | | | | 7134 | 32686 |

FIGS. 6A and 6B show stress analysis results for a connection of the present invention having a 4½ inch tubular (pipe) OD, with corresponding coupling OD as shown in corresponding TABLE 6, which follows.

tages of the present invention are most apparent.

The preferred embodiments of the present invention, as described above and shown in the Figures and Tables herein are not intended to limit the scope of the present invention, as demonstrated by the claims which follow, since one skilled in the art can, with minimal experimentation, extend the scope of the embodiments to match that of the claims.

We claim:

1. A tubular and coupling connection comprising a tubular member having a cylindrical outer surface with a tapered buttress threaded section disposed adjacent to and through the end of said outer surface, wherein said threaded section leading edge is located at the end of said tubular member and wherein said threaded section includes fully formed perfect threads and vanishing imperfect threads which vanish at the trailing edge of said threaded section, and a coupling member corresponding with said threaded tubular member and having a complementary threaded section on the internal surface thereof, said complementary threaded section including fully formed perfect threads throughout the length thereof and at least as long as the total length of said perfect and imperfect threads on said tubular member, said threaded section and complementary threaded section having threads forming crests and roots, wherein the improvement comprises:

said threads of said tubular member and said coupling member each having a pitch diameter tolerance of ±0.0015 inch;

said threads forming clearance voids between mating crests and roots ranging from slightly greater than 0.000 inches to less than 0.0035 inches;

whereby a relatively constant thread bearing contact pressure is provided over the entire length of said connection.

2. The connection of claim 1, wherein said thread pitch diameter tolerance of said threads is controlled by controlling thread tolerances comprising:

a tubular member thread taper tolerance of ±0.0015 inch;

a coupling member thread taper tolerance of ±0.0015 inch;

a third lead tolerance of ±0.001 inch per inch of perfect thread; and a perfect thread height tolerance of ±0.001 inch.

3. The connection of claim 2, wherein said thread lead total tolerance is ±0.002 inches for the entire length of said threaded section, including both perfect and imperfect threads.

4. The connection of claim 1 or claim 2 wherein said thread leading-flank angle, for an externally-threaded tubular member with a pitch diameter increasing from the leading edge to the trailing edge, is a negative angle ranging from about zero degrees to about 50 degrees and said thread following flank angle ranges from a zero degree angle to a negative angle of about 8 degrees.

5. The connection of claim 4, wherein said leading-flank angle is a negative angle ranging from about zero degrees to less than 30 degrees.

6. The connection of claim 1 or claim 2, wherein the connection is designed for sealing a predetermined working pressure and said tubular and coupling members are made of steel having an elastic range above which permanent metal deformation occurs, said threaded section of said tubular member and said complementary threaded section of said coupling member threadingly engage to within a make-up range between a minimum power-tight position and a maximum power-tight position, said minimum power-tight position being a thread make-up where said thread bearing contact pressure is within said elastic range and yet great enough to seal against at least said predetermined sealing pressure and said maximum power-tight position is said minimum power-tight position plus two and one half turns of said tubular member with respect to said coupling member.

7. The connection of claim 6, wherein said make-up range is designed to control the amount of hoop stress generated at the ends of said coupling to less than about 0.004 inches per inch strain.

8. A method of constructing a tubular and coupling connection, comprising a tubular member having a cylindrical outer surface with a tapered buttress threaded section disposed adjacent to and through the end of said outer surface, wherein said threaded section leading edge is located at the end of said tubular member and wherein said threaded section includes a length of fully formed perfect threads beginning at said leading edge and then a length of vanishing imperfect threads which vanish at the trailing edge of said threaded section, and a coupling member corresponding with said threaded tubular member and having a complementary threaded section on the internal surface thereof, said complementary threaded section including fully formed perfect threads throughout the length thereof and at least as long as the total of the lengths of said perfect and imperfect threads on said tubular member, said threaded section and complementary threaded section having threads forming crests and roots, said method including the steps of:

machining the threads of said tubular member and said coupling member, each to have a pitch diameter tolerance of ±0.0015;

forming clearance voids between mating crests and roots ranging from slightly greater than 0.000 inches to less than 0.0035 inches; and providing a relatively constant thread bearing contact pressure over the entire length of said connection.

9. The method of claim 8, wherein said tubular member pitch diameter tolerance is controlled by machining thread tolerances, comprising:

machining a tubular member thread taper tolerance ±0.0015 inch;

machining a coupling member thread taper tolerance ±0.0015 inch;

machining a thread lead to a tolerance of ±0.001 inch per inch of perfect thread; and machining a perfect thread to a tolerance of ±0.001 inch.

10. The method of claim 9, including machining said thread lead to a total tolerance to ±0.002 inches for the total length of said threaded section, including both perfect and imperfect threads.

11. The method of claim 8 or claim 9 further including the steps of threading the threaded section of the tubular member with the complementary threaded section of the coupling member until the connection reaches the minimum power-tight make-up position defined as the thread make-up where the thread bearing contact pressure is within the elastic range of the metal of the members and yet great enough to seal against at least the working pressure for the connection; and continuing to thread the connection two and one half turns after reaching the minimum power-tight make-up position.

12. The method of claim 11, further including the step of generating an amount of hoop stress at the ends of said coupling which is less than about 0.004 inches per inch of strain.

13. The method of claim 8 or claim 9, wherein:
said thread leading-flank angle, for an externally-threaded tubular member with a pitch diameter increasing from the leading edge to the trailing edge, is machined to a negative angle ranging from zero degrees to about 50 degrees; and
wherein said thread following-flank angle is machined to an angle of between zero degrees and a negative angle of about 8 degrees.

14. The method of claim 13, wherein said leading-flank angle is machined to a negative angle ranging from about zero degrees to less than 30 degrees.

15. A tubular and coupling connection comprising:
a tubular member having a cylindrical outer surface with an external tapered buttress threaded section disposed adjacent to and through the end of said outer surface;
said external threaded section having fully formed threads beginning at a leading edge located at the end of said tubular member and vanishing threads ending at a trailing edge of said external threaded section;
said external threaded section including external threads with crests and roots;
a coupling member having a length and a vertical center line, said coupling member corresponding with said tubular member and having a an inner surface with an internal threaded section complimentary to said external threaded section;
said internal threaded section having fully formed threads beginning at a leading edge located at the end of said coupling member and extending along the length thereof with said length being at least as long as the length between said leading edge and said trailing edge of said external threaded section;
said threads of said tubular member and said coupling member each having a pitch diameter tolerance of ±0.0015 inch;
said internal threaded section including internal threads with crests and roots;
said internal and external threads having stab flanks in bearing relationship and load flanks in bearing relationship;
said stab flanks having a larger flank angle than said load flanks;
said crests and roots forming clearance voids between mating crests and roots ranging from slightly greater than 0.000 inches to less than 0.0035 inches; and
said bearing relationships being relatively constant between mating external and internal threads.

16. The connection of claim 15 wherein when the outside diameter of said tubular member is 2⅜ inches, said coupling length is 8½ inches and the distance between said leading edge of said tubular member and said leading edge of said coupling member is 3-25/32 inches in the minimum power-tight position.

17. The connection of claim 15 wherein when the outside diameter of said tubular member is 2⅞ inches, said coupling length is 8½ inches and the distance between said leading edge of said tubular member and said leading edge of said coupling member is 3-13/16 inches in the minimum power-tight position.

18. The connection of claim 15 wherein when the outside diameter of said tubular member is 3½ inches, said coupling length is 8½ inches and the distance between said leading edge of said tubular member and said leading edge of said coupling member is 3⅞ inches in the minimum power-tight position.

19. The connection of claim 15 wherein when the outside diameter of said tubular member is 4½ inches, said coupling length is 9½ inches and the distance between said leading edge of said tubular member and said leading edge of said coupling member is 4⅜ inches in the minimum power-tight position.

20. The connection of any of claims 16, 17, 18 or 19 wherein when the connection is in the minimum power-tight position, the distance between said leading edge of said tubular member and said center line of said coupling member is one-half the difference of said coupling length minus twice the distance between said leading edges at the minimum power-tight position.

21. The connection of any of claims 16, 17, 18 or 19 wherein the distance of travel of said coupling leading edge between the minimum power-tight position and the maximum power-tight position is 0.312 inches.

22. The connection of claim 15 wherein said stab flanks are less than 30° to increase the compression strength of the connection.

* * * * *